United States Patent
Bottorff et al.

(10) Patent No.: US 7,944,941 B1
(45) Date of Patent: May 17, 2011

(54) HIGH SPEED ETHERNET BASED ON SONET TECHNOLOGY

(75) Inventors: Paul A. Bottorff, Palo Alto, CA (US); David W. Martin, Stittsville (CA); Ronald J. Gagnon, Nepean (CA); Roger D. Carroll, Ottawa (CA); Yuet C. Lee, Danville, CA (US)

(73) Assignee: Ciena Corporation, Linthicum, MD (US)

( * ) Notice: Subject to any disclaimer, the term of this patent is extended or adjusted under 35 U.S.C. 154(b) by 1683 days.

(21) Appl. No.: 09/979,983

(22) PCT Filed: May 29, 2000

(86) PCT No.: PCT/CA00/00626
§ 371 (c)(1),
(2), (4) Date: Nov. 8, 2004

(87) PCT Pub. No.: WO00/74282
PCT Pub. Date: Dec. 7, 2000

(30) Foreign Application Priority Data

Jun. 1, 1999 (CA) .................................... 2273522

(51) Int. Cl.
*H04J 3/22* (2006.01)
*H04J 3/00* (2006.01)
*H04J 3/24* (2006.01)
*H04L 12/28* (2006.01)

(52) U.S. Cl. ...................... 370/466; 370/395.5; 370/474; 370/476; 370/907

(58) Field of Classification Search .................. 370/474, 370/476, 79, 907
See application file for complete search history.

(56) References Cited

U.S. PATENT DOCUMENTS

| | | | | |
|---|---|---|---|---|
| 5,265,096 A * | 11/1993 | Parruck | ......................... | 370/216 |
| 5,274,641 A * | 12/1993 | Shobatake et al. | ............ | 370/392 |
| 5,365,510 A * | 11/1994 | Nicholson et al. | ............ | 370/222 |
| 5,412,648 A * | 5/1995 | Fan | ................................. | 370/414 |
| 5,461,622 A * | 10/1995 | Bleickardt et al. | ............ | 370/470 |
| 5,490,140 A * | 2/1996 | Abensour et al. | ............. | 370/352 |
| 5,526,353 A * | 6/1996 | Henley et al. | ................. | 370/392 |
| 5,535,199 A * | 7/1996 | Amri et al. | .................... | 370/392 |
| 5,737,373 A * | 4/1998 | Sato et al. | ..................... | 375/376 |
| 5,781,535 A * | 7/1998 | Russ et al. | .................... | 370/248 |
| 5,892,910 A * | 4/1999 | Safadi | .......................... | 709/217 |
| 5,953,666 A * | 9/1999 | Lehtimaki | .................... | 455/439 |
| 6,014,708 A * | 1/2000 | Klish | .............................. | 709/232 |
| 6,081,507 A * | 6/2000 | Chao et al. | .................... | 370/235 |
| 6,269,096 B1 * | 7/2001 | Hann et al. | .................... | 370/366 |
| 6,389,036 B1 * | 5/2002 | Stewart et al. | ................ | 370/466 |
| 6,654,802 B1 * | 11/2003 | Oliva et al. | .................... | 709/224 |
| 6,683,855 B1 * | 1/2004 | Bordogna et al. | ............. | 370/244 |
| 6,765,928 B1 * | 7/2004 | Sethuram et al. | .............. | 370/476 |
| 6,891,862 B1 * | 5/2005 | Brady et al. | ................... | 370/539 |
| 6,901,082 B1 * | 5/2005 | Purse | ............................ | 370/535 |
| 2003/0043734 A1 * | 3/2003 | Takeguchi | ..................... | 370/216 |
| 2005/0002671 A1 * | 1/2005 | Smith et al. | ..................... | 398/83 |

* cited by examiner

*Primary Examiner* — Kwang B Yao
*Assistant Examiner* — Jutai Kao
(74) *Attorney, Agent, or Firm* — Christopher & Weisberg, P.A.

(57) ABSTRACT

A high-speed Ethernet using Thin SONET technology as the physical layer carrier makes use the large embedded base of SONET equipment, and is a step forward in integrating WANs, MANs and LANs. The HS Ethernet also takes advantage or current SONET functionality, such as framing, scrambling, integrity, etc. FEC fields are provided in the TOH for achieving a high level of error correction. The HS Ethernet frame comprises a length-type field generated at the PCS sublayer and a HEC field generated at the PMA layer. The frames are routed within a network using the source address, the destination address and a label.

12 Claims, 6 Drawing Sheets

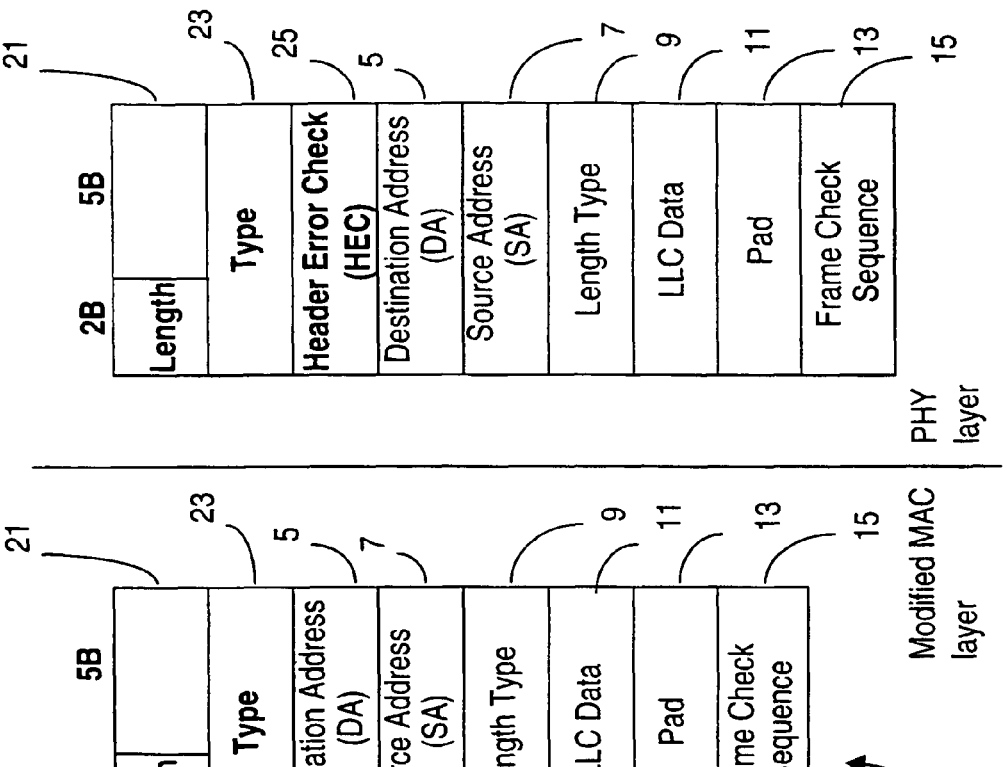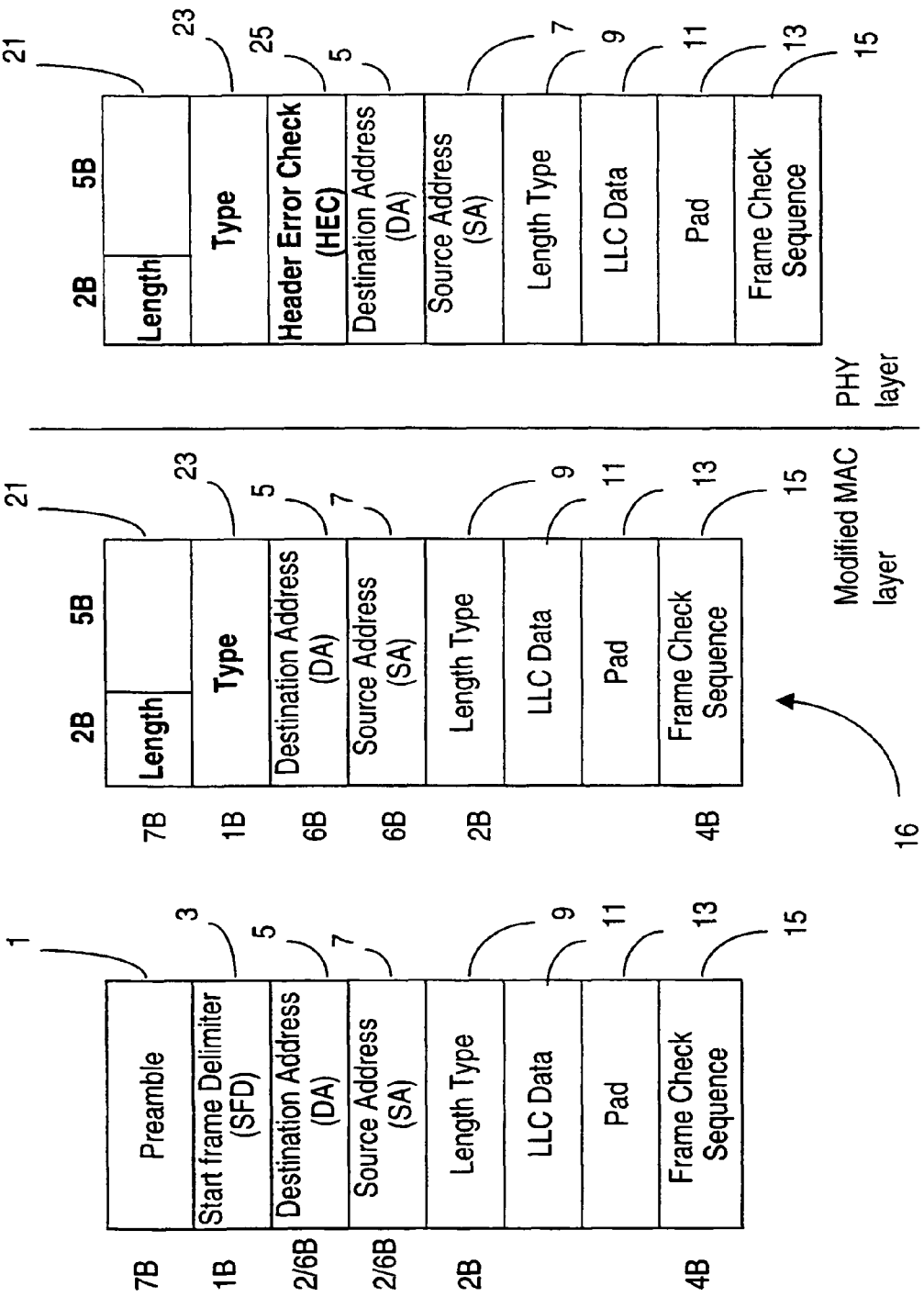

HIGH SPEED ETHERNET BASED ON SONET TECHNOLOGY

BACKGROUND OF THE INVENTION

1. Field of the Invention

This invention is directed to enhancements to traditional Ethernet functionality and in particular to a high speed (HS) Ethernet based on SONET technology:

2. Background Art

For the last decades, the industry has evolved from voice circuit switching to data message switching, then to data oriented packet switching. In the past years, other technologies have been introduced into the marketplace to enhance or supplant these older technologies, such as frame relay, fast Ethernet, switched Ethernet, and ATM. Yet even some of these technologies do not solve the current problems; frame relay is fundamentally for wide area network (WAN) technology and fast Ethernet and switched Ethernet are for local area network (LAN) technologies.

In 1984 CCITT adopted the first I-series Recommendations which was a milestone in the development of integrated services digital networks. These Recommendations are concerned with services, network-network interfaces (NNI), user-network interfaces (UNI) and overall network aspects.

OSI (open system interconnection) is a reference model defining a seven-layer framework of protocols for data communications, designed with the purpose to allow any computer anywhere in the world to communicate with any other, as long as they obey the OSI standards. Layering divides the total communications problem into smaller functions, while ensuring independence of each layer from the next layer, by defining services provided by a layer to the next layer, independent of how these services are performed.

The lowest layer is the physical layer (PHY), covering the physical interfaces between the devices, and is concerned with transmitting raw bits over communication channels, and informing layer two (Data Link) of loss of connectivity. Physical layer functions are for example add, drop and multiplexing of traffic. The add/drop multiplexer (ADM) can multiplex/demultiplex any of its various tributary inputs into/from a line signal and it can be used as a hub, an ADM, or a terminal. When used as an ADM, it only accesses signals that need to be dropped or added at that site, the rest of the traffic passes straight through.

An important task of the data link layer (second layer) is to break data into frames, to then transmit these frames sequentially and, in some cases, to process acknowledgement frames sent back by the receiver. The network layer (the third layer) provides the functional and procedural means to set-up and terminate a call, to route data and to control the data flow across the network. The remaining layers are application oriented, being concerned with providing various service functions to the users, such as session control, network management, and other services.

Some technologies are more appropriately applied at certain layers. For example, SONET is a physical layer technology and is used as a transport service for ATM, SMDS, frame relay, T1, E1, etc, while ATM operates on SONET, copper, twisted pairs, FDDI as physical layer, the data layer being subdivided into an ATM layer and an ATM adaptation layer.

Local area networks (LANs) connect personal computers to one another and to shared machines. Both general purpose computers called hosts or clients, and special purpose computers called servers, provide communal files, e-mail, etc.

The oldest and best known LAN is the Ethernet, which in many cases operates on FDDI (fiber distributed data interface) physical layer, and a media access control (MAC) layer, placed on top of FDDI, comprises the data layer.

The IEEE became involved in setting standards for LANs under 802 committee, and assumed a role in leading LAN standards bodies. Ethernet was published as IEEE 802.3 designed for data applications is based on a shared bus in which all stations on the network share the media.

A wide area network (WAN) is a packet switched public data network that connects various packet switching nodes and transmission facilities to customer premises equipment (computer stations). A WAN differs from the LAN in geographic coverage and data rates, and also in technology.

The metropolitan area network (MAN) technology differs from the LAN and WAN in geographic coverage and data rates. A MAN could be owned by an organization, or could be public, and enables users to share efficiently widely distributed resources. A MAN could also serve as a backbone of a network that interconnects distributed LANs. Currently, the MAN evolves towards WAN technologies in the backbone, due to the increased demand in data communication.

It has become evident that LAN shared bus architecture is insufficient to meet the demands of applications that require more bandwidth, and that LANs are beginning to become a bottleneck in computing environments. For this reason, the separation of data into cells is deferred until within the network, but the higher level information is carried to the end station.

Switched Ethernet technology, developed to provide more capacity to an end-user, does not rely on shared medium, it rather provides point-to-point bandwidth between the user station and the switch, so that instead of sharing a 10 Mbit/s medium, the user gets a dedicated 10 Mbits/s medium. A switched Ethernet network is more flexible, in that it may include stations that are using a port at a given full rate, stations that share a port, or stations that have access to more than one port.

However, switched Ethernet provides only limited bandwidth and supports data traffic only. As Ethernet hubs and switches are growing in use, they become an inexpensive means to provide more bandwidth to workstations. A more efficient solution for bursty traffic is needed. There is also a need to simplify and standardize the access link while also providing protection of the access traffic.

Nonetheless, of great concern for network providers in the era of the data transmission is the LAN performance at higher speeds. 10 Gb/s market is emerging fast in campus backbone networks.

In addition, several existing problems cannot be solved by the current solutions. For example, the LAN bandwidth is currently provisioned in a rigid manner, while many users need scaleable bandwidth for different applications.

It would be highly beneficial to have a uniform architecture for LANs, MANs and WANs, by seamlessly bridging the LAN technology onto MAN and WAN through the same frame protocol and transmission technology.

The dominant signal format in the fiber optic networks follows the synchronous standard SONET in North America and SDH elsewhere. In this specification, SONET is defined to include SDH. SONET enables the multiplexing, adding and dropping and general transportation of signals through these networks.

For a service, being able to be easily transported by a SONET network is a valuable attribute, in that the network provider can make use of the large base of installed SONET-compatible equipment. As well, SONET provides the ability to combine and consolidate traffic from different locations through one facility (grooming), and reduces the amount of back-to-back multiplexing. More importantly, network providers can reduce the operation cost of their transmission network by using the operation, administration, maintenance and provisioning (OAM&P) features of SONET.

Mapping of one rate or format into another is well known. Bellcore GR-232 describes in detail the standard mappings of the common asynchronous transmission formats (DS0, DS1, DS2, DS3, etc) into SONET. Similar mappings are defined for the ETSI hierarchy mapping into SDH. Optical transmission equipment designed for mapping one proprietary format into another is also available on the market, e.g. Nortel's FD-565 could carry the FD-135 proprietary format as well as the DS3 standard format.

As a physical carrier technology and also due to the advantages listed above, SONET looks as a candidate of choice for carrying Ethernet. No attempts are known to the applicants that efficiently map Ethernet into a SONET container to take advantage of the SONET features and of the installed base of SONET equipment. There is a need for an efficient method to map Ethernet signals into SONET such that the signals can be recovered with low timing jitter and inexpensive hardware.

SUMMARY OF THE INVENTION

It is an object of the present invention to converge optical physical layer and LAN technologies to provide a high rate Ethernet.

It is another object of this invention to evolve the LAN/campus technology onto MAN and WAN technologies by using the same protocol and transmission technology. Enhancements to the traditional Ethernet are also provided.

A method for carrying medium access control MAC frames in a synchronous transport container, comprising selecting a synchronous container for transporting a payload at a predetermined rate, generating a plurality of high speed HS MAC frames, mapping the HS frames into the payload.

A method for routing a high-speed HS frame within a mesh-type network comprising providing said HS frame with a source address for identifying a source end station, a label which identifies a current path and a destination address for identifying a destination end station.

Advantageously, by using SONET technology as the physical layer carrier for Ethernet the network providers can continue to use the large embedded base of SONET equipment, which results in important cost savings on new equipment. The HS Ethernet according to the invention also takes advantage of current SONET functionality, such as framing, scrambling, integrity, etc.

In addition, this invention is a step forward in integrating WANs, MANs and LANs. The application domains for the HS Ethernet ranges from intra-office (less than 500 m), campus (less than 5 km) metro (less than 50 km) and longhaul spans (more than 50 km).

BRIEF DESCRIPTION OF THE DRAWINGS

The foregoing and other objects, features and advantages of the invention will be apparent from the following more particular description of the preferred embodiments, as illustrated in the appended drawings, where:

FIG. 3A shows MAC frame format according to IEEE 802.3;

FIG. 3B shows MAC frame format modified according to an embodiment of the invention;

DESCRIPTION OF THE PREFERRED EMBODIMENT

Figure 1B:
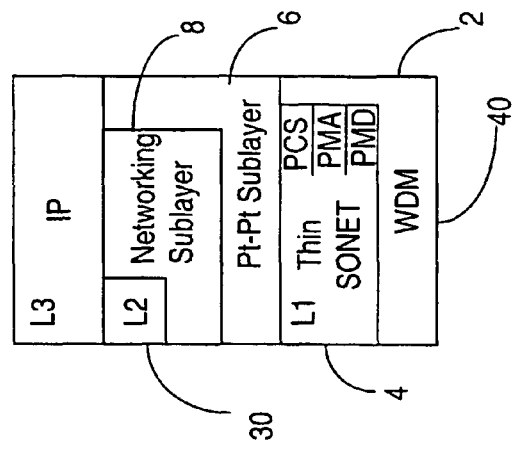
FIG. 1B shows the LAN relationship to the OSI reference model according to an embodiment of the invention.
Figure 1A:
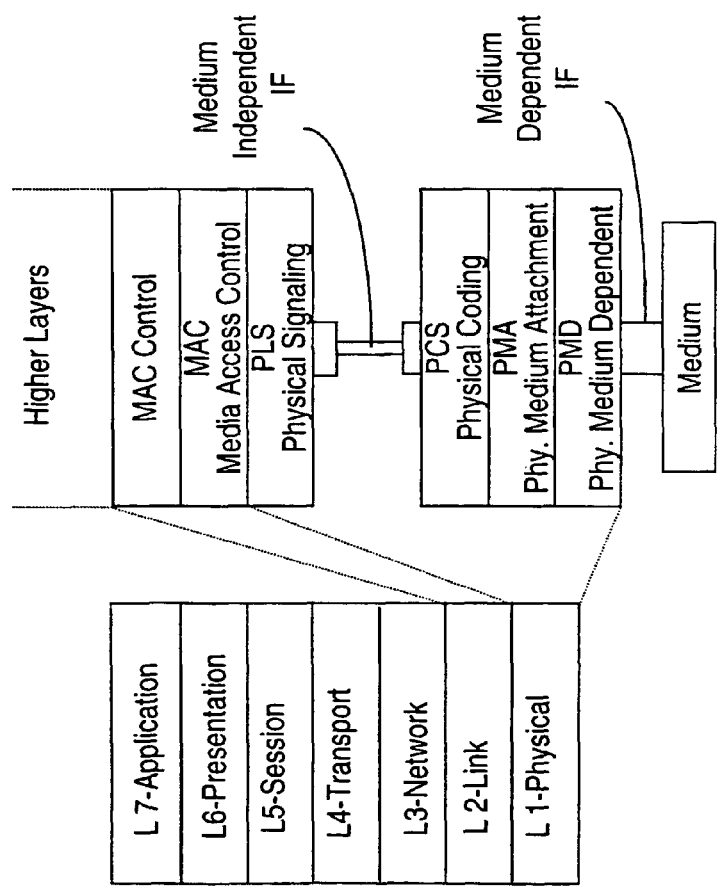
FIG. 1A shows the traditional LAN standard relationship to the OSI reference model.

FIG. 1A shows the traditional LAN standard relationship to the OSI reference model as per IEEE 802.3 standard. The standard defines three sub-layers in L1, namely the physical coding (PCS) sublayer, the physical medium attachment (PMA) sublayer, and the physical medium dependent (PMD) sublayer. Two compatibility interfaces, namely the medium dependent interface (MDI) and the medium independent interface connect the physical layer with the medium and with another sublayer of L1, namely the signalling sublayer (PLS), respectively.

The data link layer is also divided into two sublayers, namely the media access control (MAC), and the MAC control sublayer.

FIG. 1B shows the LAN relationship to the OSI reference model for the HS Ethernet according to the embodiment of the invention. The physical layer is Thin SONET as shown at 4, based on WDM technology, shown at 2, and is responsible with transport functions. The SONET layer 4 performs framing/delineation, scrambling, parity check, forward error correction (FEC), protection of traffic, and monitors payload type, quality of service, etc. The WDM layer 2 is concerned with the functions of the OTN (optical transport network—defined by ITU-T SG15), OCH (optical channel, first of three sublayers in the optical signal to noise ratio (OTN), and is concerned with trace, OSNR, protection, and payload type. Also, a data communication channel is provided at the physical layer.

The functions that are key to point-to-point and networking applications are assigned to different sublayers of the data link layer. Namely, the MAC sublayer is further divided into a point-to-point sublayer 6, and a networking sublayer 8. The point-to-point sublayer 6 is concerned with MAC frame delineation, header check generation, payload scrambling, payload type and FEC, point-to-point management of frames, operation state reporting and error reporting. Networking sublayer 8 is concerned with link addressing, flow routing, buffer management, queue scheduling and congestion management.

Figure 2:
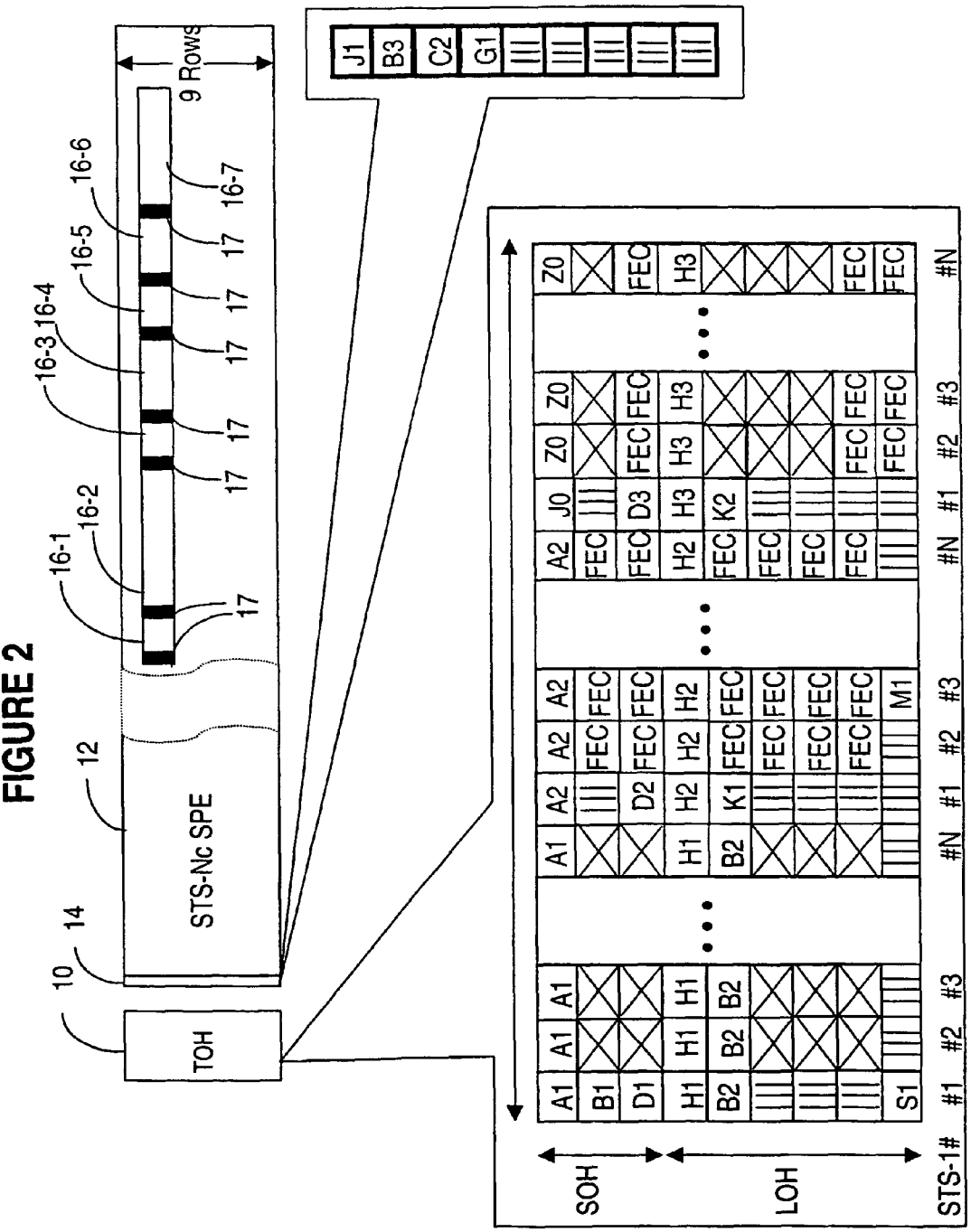
FIG. 2 shows a Thin SONET STS-192c signal.

FIG. 2 shows a Thin SONET STS-Nc container for the HS Ethernet by way of an example for describing an embodiment of the present invention.

The SONET standards ANSI T1.105 and Bellcore GR-253-CORE, define the physical interface, optical line rates known as optical carrier (OC) signals, a frame format, and an OAM&P protocol. Opto/electrical conversion takes place at the periphery of the SONET network, where the optical signals are converted into a standard electrical format called the synchronous transport signal (STS), which is the equivalent of the optical signal. Namely, the STS signals are carried by a respective optical carrier, which is defined according to the STS that it carries. Thus, an STS-192 signal is carried by an OC-192 optical signal.

The STS-1 frame consists of 90 columns by 9 rows of bytes; the frame length is 125 microseconds. A frame comprises a transport overhead (TOH) occupying 3 columns by 9 rows of bytes and a synchronous payload envelope (SPE) occupying 87 columns of 9 rows of bytes. The first column of the SPE is occupied by path overhead bytes. As such, an STS-1 has a bit rate of 51.840 Mb/s.

Higher rates, STS-N are built by multiplexing tributaries of a lower rate, where N=1, 3, 6, ... 192 or higher, using SONET add/drop multiplexers. An STS-N signal is obtained by interleaving N STS-1 signals, which are separately aligned within the envelope. The STS-N has a TOH made of all N TOHs of the individual tributaries, and a SPE made of all N SPEs of the tributaries, each with its own POH. The individual tributaries could carry a different payload, each with a different destination.

Some services require more than an STS-1, as they operate at a higher rate. These services are transmitted in an STS-Nc signal (c for concatenation).

FIG. 2 shows the TOH 10, the envelope STS-Nc SPE 12 and the POH 14. The STS-1s into the STS-Nc signal are kept together, rather than interleaved. The whole envelope of the STS-Nc signal is routed, multiplexed and transported as a single entity rather than as N individual entities. The TOH and the start of the SPE for the N constituents are all aligned, since all the constituents are generated by the same source, with the same clock. The first STS-1 in the concatenated signal carries the single set of POH 14, all that is required for an STS-Nc. The TOH field has 3 columns×9 rows×N bytes, the POH occupies a column, i.e. 9 bytes, and the payload has 87−(N/3−1)columns×9 rows×(N−1) bytes. For example, the STS-192c payload capacity is 9,584,640 Gb/s.

Lately, SONET evolved in towards a simpler structure for the TOH, which is known as "Thin SONET". The TOH of the Thin SONET carries only OAM&P information that is essential to the data in the associated payload.

FIG. 2 shows the byte allocation for the TOH and POH for a Thin STS-192c according to the embodiment of the invention of course a person skilled in the art will appreciate that the invention also relates to equivalent SDH signals, for example a thin STM-64C. The framing information, carried by bytes A1 and A2 is maintained, along with the information regarding the beginning of the payload, bytes H1-H3. The error information provided by the BIP-8 bytes B1-S3 is also preserved, and forward error correction TEC) bytes are provided as shown. It is to be noted that the first FEC information shown is by way of example, other TOH byte locations are possible.

Maintained also are the auto-protection switching (APS) bytes K1 and K2, so that the HS Ethernet can take advantage of the protection switching capabilities of SONET.

The undefined overhead bytes are shown as a crossed-over rectangle, while the bytes that are defined, but not used as not necessary, are shown as a rectangle with three vertical lines.

According to the embodiment of this invention, Ethernet frames 16 are mapped into a Thin SONET STS-Nc SPE 12. FIG. 2 illustrates variable length frames 16-1 to 16-7, also showing synchronization sequences 17, as it will be discussed later in connection with FIG. 8. The HS Ethernet over Thin SONET combination is advantageous for many reasons. The OC-192 SONET line rate is 9.953280 Gbs, which is almost 10 Gbs. Nonetheless, the OC-192 example is appropriate for the current generation of optical networks. It is to be understood that this mapping is applicable to other SONET rates, as the invention is not limited to STS-192 line rate. Future generations may scale on SONET steps (4×) steps.

Another advantage is that the size of the overhead (OH) is small in comparison to other available technologies. The Thin SONET overall OH usage is about 3.7%. Other line encoding schemes typically have more overhead. For example, 8B/10B used in 1 GB Ethernet has 25% OH. It is evident that use of Thin SONET is advantageous from this point of view.

Furthermore, numerous advantages result from using the SONET format. Firstly, this allows maintaining compatibility with existing long-haul WAN networks, which results in a simple WAN-LAN integration. For example, there is a large installed base of long haul 3R repeaters, which are sensitive to both the frequency and the format of SONET frames. (A 3R repeater is an electronic repeater that Reshapes, Regenerates, and Re-times the signal passing through it.) If the SONET format is used, these 3R repeaters could be used by HS Ethernet.

Using Thin SONET approach allows reuse of commercially available parts like serializer/deserializer, oscillators, optical transmitters and receivers for both long and short reach.

Also, retaining SONET line frequency, frame format and section overhead allows HS Ethernet compatibility with the existing transmission networks. Retaining the SONET LOH and POH allows the HS Ethernet to operate as tributary on higher rate SONET signals, such as OC-768, in the future. Furthermore, by keeping the SONET transmission frequency and frame overhead, it is possible to carry the HS Ethernet over a single WDM frequency without an intervening switch.

Returning now to FIG. 1 B, the physical medium attachment sublayer PMA adds the POH, LOH SOH according to the invention, and performs scrambling of the frames using a first polynomial P1. The physical coding sublayer PCS performs scrambling of the frames using a second polynomial P2, to prevent MAC frames consisting of data sequences that encode said first polynomial ("killer MAC frames") i.e. frames that encode the PMA scrambler. The PCS then performs header error check (HEC) generation and embedding.

Scrambled encoding provides line encode efficiency equivalent to NRZ. Other advantages of using scrambled line encoding are the very low percentile of OH (nearly 0%), and therefore greater optical reach compared with that for group codes (25% OH for example for gigabit Ethernet 8B/10B). A disadvantage of scrambled line encoding is that the DC balance may be non-zero over periods of several bits. The DC balance is maintained by selecting polynomial P1:

$$P1 = x^7 + x^6 + 1$$

Killer MAC frames, which encode the P1 bit sequence are prevented by scrambling all MAC frames in the PCS using polynomial P2:

$$P2 = x^{43} + 1$$

According to an embodiment of the invention, the payload is scrambled with a first polynomial to provide a scrambled payload, wherein the zero and one bits are distributed uniformly for DC balance. Furthermore, the second polynomial P2 further randomizes all data sequences which could have encoded said first polynomial.

FIG. 3A shows a MAC frame format according to the IEEE 802.3 standard. The MAC frame comprises a preamble field 1, a start frame delimiter field (SDF) 3, a destination address field (DA) 5, a source address field (SA) 7, a length type field 9, data and pad fields 11, 13 and the frame check sequence field (FCS) 15. A cyclic redundancy check is used by the transmit and receive algorithms to generate a value for the FCS field 15, which is computed as a function of the contents of the other fields, except the preamble.

FIG. 3B shows a MAC frame format modified according to the embodiment of the invention.

The changes are concerned with defining an 8-byte length/type preamble, as shown at 21 and 23, rather than the SFD preamble for the MAC frame. Field 21 gives, among other, the length of the frame, and it is used to determine the beginning of the next frame. The type field 23 indicates if the frame comprises data, is idle or comprises management/control data. The control frames may be placed between data and idle frames, and may be used in place of special character codes for management.

Figure 3C:
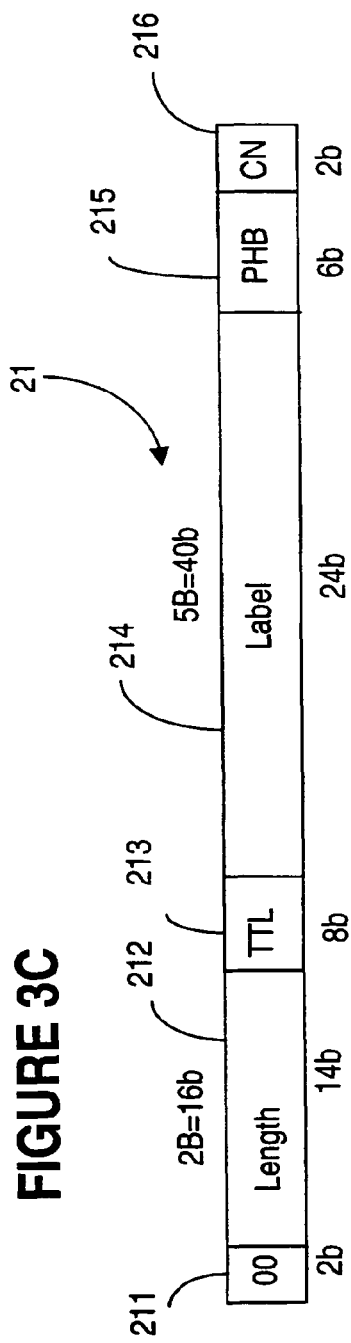
FIG. 3C shows the length field of the modified MAC frame in detail.

FIG. 3C shows the field 21 of the modified MAC frame in detail. The length subfield 212 indicates the length of the frame, The subfield 213 defined as time-to-live (TTL) is used to limit network looping of the frame. Subfield 214 called Label indicates a service and a path to the service. Subfield 215 called per-hop-behaviour (PHB) indicates the quality of service to be used for buffer management, and the subfield 216, congestion notification (CN), is used for buffer overload notification.

Another change to the 802.3 MAC frame is the addition of a header error check (HEC) field in the frame at the physical layer, as shown at 25, FIG. 3B.

Frame delimiting, that is not available with scrambled line encode, is provided using a HEC check algorithm in field 25. It is the lowest line overhead algorithm, has a predictable size, and a low probability of frame misalignment. Making multiple matches of the HEC sequence lowers the probability of frame misalignment.

Figure 4:
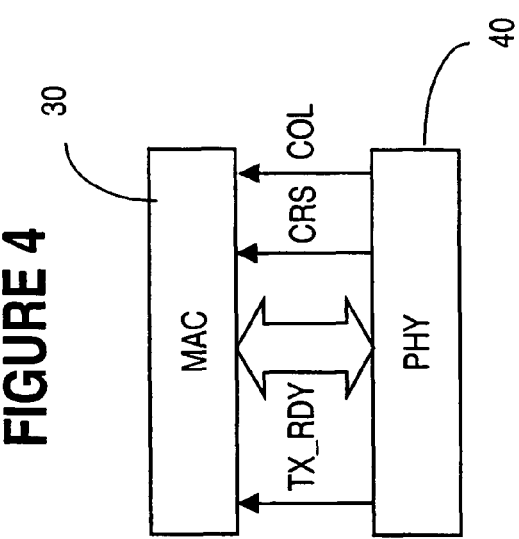
FIG. 4 illustrates how the MAC layer is paced by the physical layer to allow variable length encoding in the physical layer.

The MAC layer is paced by the physical layer to allow variable length encoding in the physical layer. This is generically shown in FIG. 4. The TX_RDY signal notifies the MAC layer when the physical layer is capable of transmitting.

Figure 5:
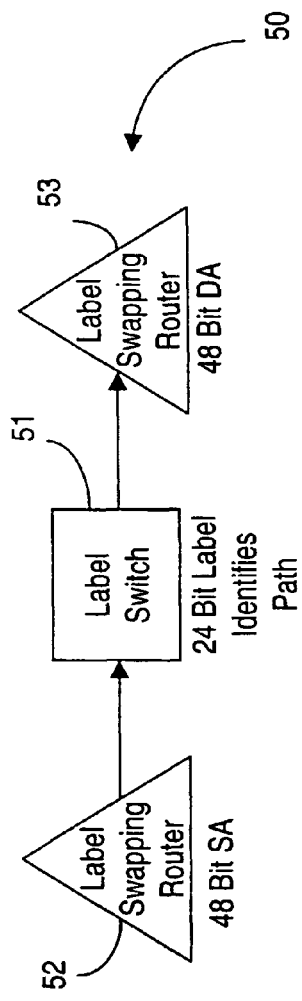
FIG. 5 illustrates the principle of label switching.
Figure 6:
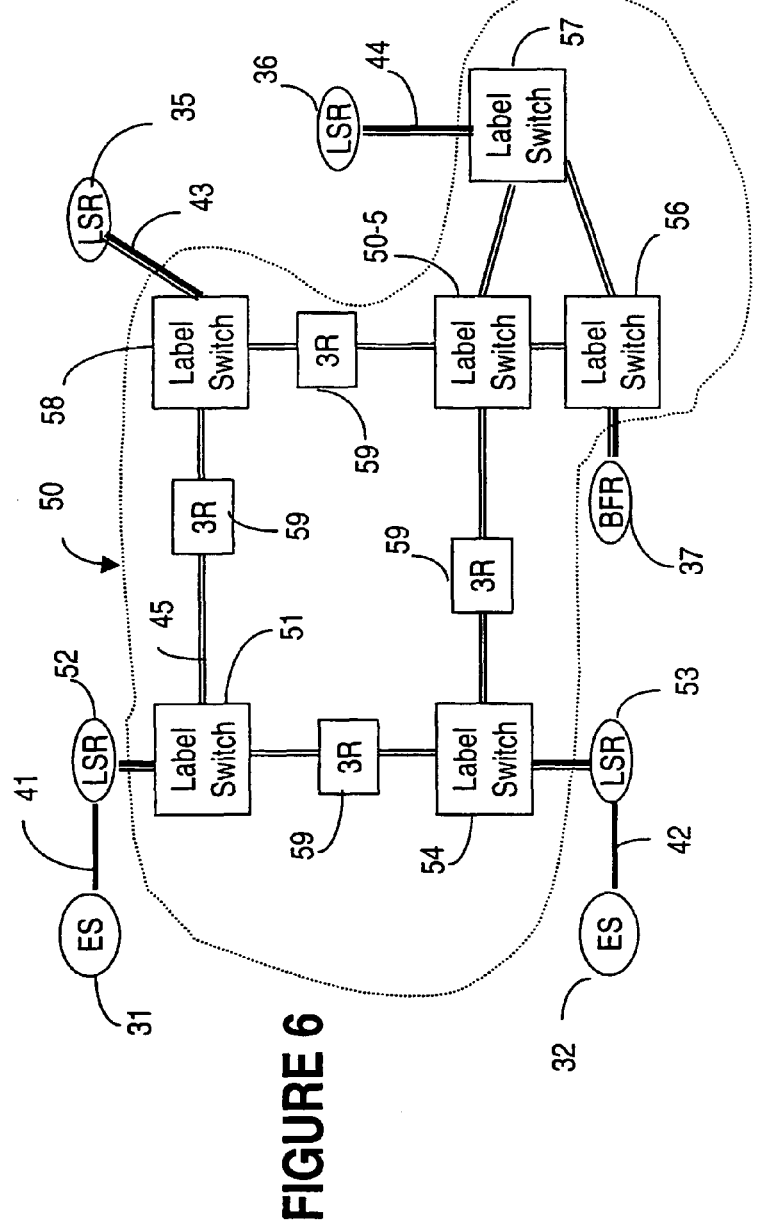
FIG. 6 illustrates an example of a HS Ethernet network according to an embodiment of the invention.

As seen in the FIGS. 3B and 3C, each HS Ethernet frame contains an address triple, namely a 48 bit source address 7, a 48 bit destination address 5, and a 24 bit label field 214. The label field 214 is able to identify the following path types: multipoint-to point, point-to-point and point-to-multipoint. FIGS. 5 and 6 illustrate the principle of label switching.

An HS Ethernet network comprises label swapping routers 52 and 52 which translate a destination IP address to a label value according to the identification of a free path between a source and a destination in the network. A label switch 51 examines the label, compares it with a list of labeVports and forwards the frame out the corresponding port, generally with a new label value. The assignment of label values can either be via provisioning or automatically via a control plane protocol.

FIG. 6 illustrates an example of an HS Ethernet network according to the embodiment of the invention. The network comprises end stations 31 and 32, switches 51, 54, 55, 56, 75, 58, and label switching routers 52, 53, 35, 36, 37. The link types in the network are end-station to end-station links 41 and 42 illustrated in full lines, 10GE LSR to label switch links 43, 44, shown in uneven double lines, and 10GE label switch to label switch links shown in double lines, 45.

FIG. 6 also shows 3R regenerators 60 provided on spans longer than approximately 400 km.

An LRS or LS station performs, for the sending direction, scrambling of the MAC frame with P2, HEC generation and embedding, mapping of the scrambled MAC frames into the Thin SONET envelope, scrambling with P1, and transmission over the network. The reverse operations are performed for the receiving direction.

Scrambling is done, as indicated above using P1 and P2. P2 is applied to the entire MAC frame, while P1 is applied per the SONET standard to the section signal.

Polynomial P1 is synchronized at regular intervals by sending an unscrambled synchronization sequence. P1 restarts at the beginning of each synchronization frame. The P2 scrambler is self-synchronizing. It requires only 43 scrambled data bits to achieve synchronization.

Figure 7:
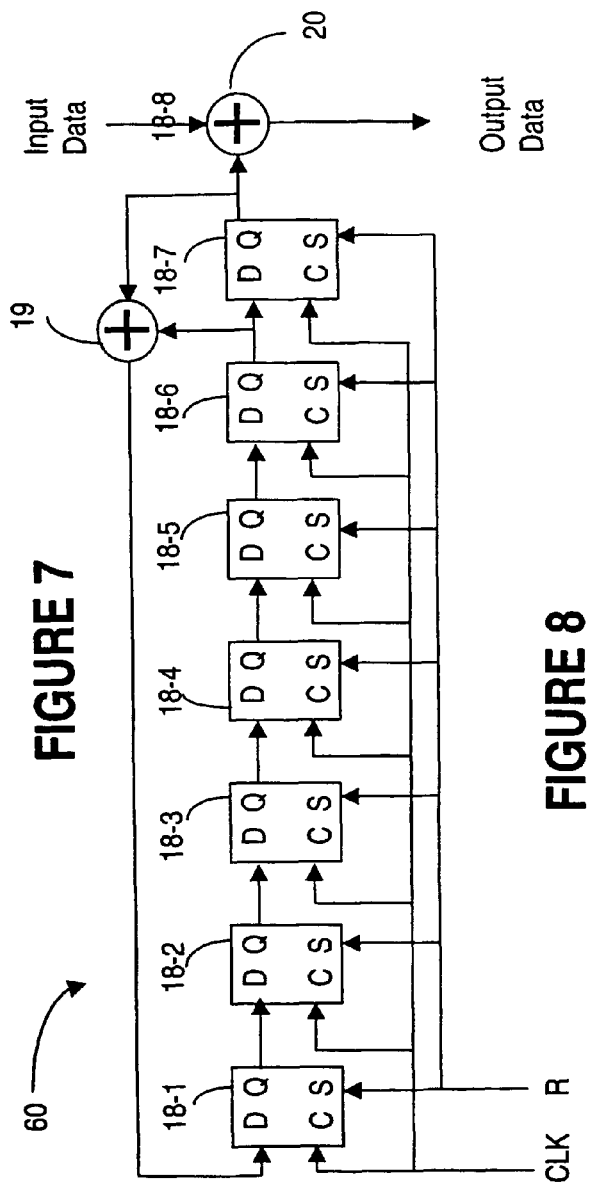
FIG. 7 shows a scrambling circuit for generating high randomization of the payload.

FIG. 7 shows a scrambler 60 that produces polynomial P1. The clock is latched with 7 flip-flops 18-1 to 18-7, so that the signal at the output of flip-flop 18-7 is $x^6$, and the signal at the output of 18-7 is $x^7$. A first XOR 19 provides a feedback to flip-flop 18-1, which receives on the D input $x^6$ xor-ed with $x^7$. A second XOR 20 receives the input data and P1 and provides the scrambled output data.

Scrambler synchronization is signalled from the transmitter to the receiver by periodically sending an unscrambled synchronization string, as shown in FIG. 2 by the A, A2 bytes in the SOH. Each synchronization string is a fixed distance in transmitter bytes from the previous string "Sync". Receivers synchronize the P1 scrambler 60 by re-setting to 1111111 at the end of the "Sync" sequence. The receiver removes the "Sync" string from the data stream before passing data up to the PCS.

Figure 8:
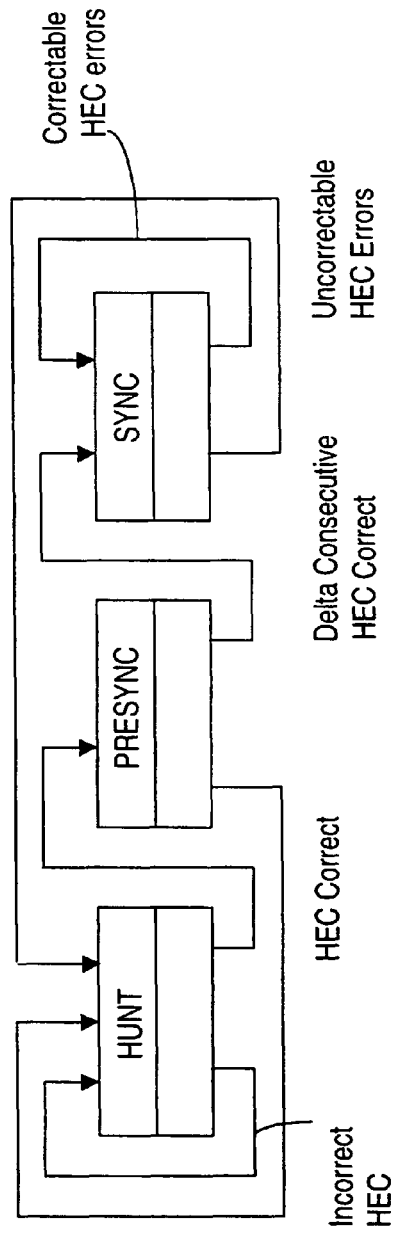
FIG. 8 illustrates the frame synchronization.

The PCS performs MAC frame synchronization based on matching a 16 bit CRC (HEC) repeatedly, with the previous bytes. This state machine is shown in FIG. 8. While searching for a HEC match, the system is in the Hunt state. Upon a HEC match, it goes to a Pre-sync state. If no subsequent HEC matches occur, it returns to Hunt state. If subsequent matches occur, it moves to Sync, where there is some tolerance to HEC bit errors.

Figure 9:
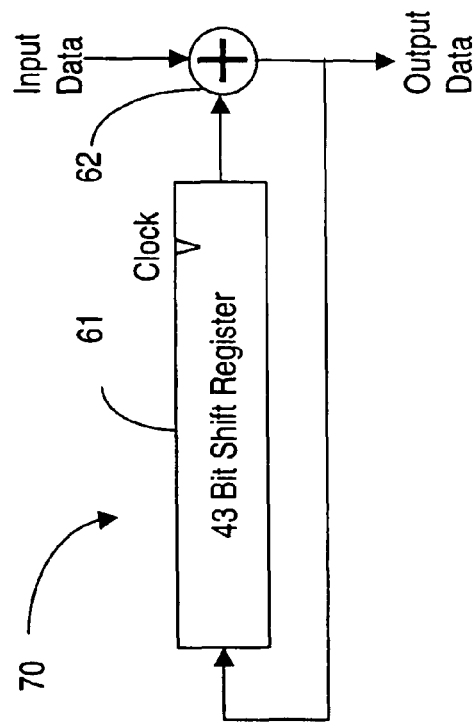
FIG. 9 shows a scrambling circuit for preventing killer MAC frames.

FIG. 9 shows a scrambling circuit 70 for preventing killer MAC frames, using P2. The scrambler comprises a 43-bit shift register 61 which provides second polynomial P2, which is then xor-ed with the input data to obtain the output data using XOR 62. As indicated above, this is used for preventing killer MAC frames that encode the P1. This is a self-synchronizing polynomial and is applied after frame synchronization.

While the invention has been described with reference to particular example embodiments, further modifications and improvements, which will occur to those skilled in the art, may be made within the purview of the appended claims, without departing from the scope of the invention in its broader aspect.

We claim:

1. A method for carrying medium access control (MAC) frames in a
   synchronous transport container, comprising:
   selecting a synchronous container for transporting a payload at a predetermined rate;
   generating a plurality of high speed (HS) MAC frames, generating an HS frame including:
   generating a link-layer HS frame wherein the preamble and start frame delimiter fields of an Ethernet frame are used for a length and a type fields
   wherein said length field includes:
   a length sub-field, indicating the length of said HS frame:
   a time-to-live subfield for limiting the looping of said HS frame in case of a fault;
   a label subfield for indicating a service and a path to said service;
   a per-hop behavior field indicating the quality of service for said data; and
   a congestion notification sub-field: and
   providing a physical layer HS frame by addition of a header error check HEC to said link-layer HS frame; and mapping said HS frames into said payload;

wherein said synchronous container is a SONET/SDH carrier comprising a reduced-size transport overhead (TOH) wherein the reduced-size transport overhead (TOH) has a same structure as a standard SONET/SDH carrier TOH, but includes reduced overhead information; and wherein said mapping step comprises not using some defined bytes of the standard SONET/SDH carrier TOH.

2. A method as claimed in claim 1, wherein said reduced-size TOH comprises APS bytes for enabling protection switching capabilities for said payload.

3. A method as claimed in claim 1, wherein said reduced-size TOH comprises section and line BIP-8 bytes for monitoring a transmission section and respectively a transmission line for errors.

4. A method as claimed in claim 1, wherein said reduced-size TOH comprises framing bytes for indicating the beginning of said synchronous container and pointer bytes for indicating the beginning of said payload.

5. A method as claimed in claim 1, wherein said reduced-size TOH comprises forward error correction FEC bytes.

6. A method as claimed in claim 1, wherein said type field qualifies said HS frame as a data frame, an idle frame, or a management/control frame.

7. A method as claimed in claim 1, further comprising scrambling said payload with a first polynomial to provide a scrambled payload, wherein the zero and one bits are distributed uniformly for DC balance.

8. A method as claimed in claim 7, wherein said step of mapping comprises scrambling said HS frame using a second polynomial, which further randomizes all data sequences which could have encoded said first polynomial.

9. A method as claimed in claim 8, further comprising synchronizing said first polynomial at regular intervals using a Sync sequence.

10. A method as claimed in claim 9, wherein said second polynomial is autosynchronizing.

11. A method as claimed in claim 1 wherein said SONET/SDH carrier is a Thin STS-192c/STM64c.

12. A method as claimed in claim 1 wherein the reduced-size transport overhead (TOH) reduces the overhead information by not using some bytes defined in both the SONET and SDH standards.

* * * * *